(12) United States Patent
Brown et al.

(10) Patent No.: US 6,561,269 B1
(45) Date of Patent: May 13, 2003

(54) CANISTER, SEALING METHOD AND COMPOSITION FOR SEALING A BOREHOLE

(75) Inventors: Donald W. Brown, Los Alamos, NM (US); Arun S. Wagh, Orland Park, IL (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/510,663

(22) Filed: Feb. 22, 2000

Related U.S. Application Data

(60) Provisional application No. 60/131,752, filed on Apr. 30, 1999.

(51) Int. Cl.$^7$ .............................................. E21B 47/00
(52) U.S. Cl. .................... 166/77.1; 166/77.4; 166/90.1; 166/97.1; 166/101; 166/116; 166/153; 166/187; 175/217; 175/228; 175/230; 175/232
(58) Field of Search ............................. 222/1, 249, 251, 222/255; 166/77.1, 77.4, 90.1, 97.1, 101, 116, 153, 187, 268; 175/217, 228, 230, 232

(56) References Cited

U.S. PATENT DOCUMENTS

| | | | | |
|---|---|---|---|---|
| 3,785,537 A | * | 1/1974 | Appleby ...................... 222/464 |
| 4,072,015 A | * | 2/1978 | Morell et al. ................... 61/35 |
| 4,083,406 A | | 4/1978 | Metz ........................... 166/286 |
| 4,786,328 A | | 11/1988 | Weill et al. .................... 106/85 |
| 4,797,159 A | | 1/1989 | Spangle ........................ 106/89 |
| 4,842,487 A | * | 6/1989 | Buckman et al. ............ 417/132 |
| 5,083,683 A | * | 1/1992 | Knickerbocker ............. 222/382 |
| 5,106,423 A | | 4/1992 | Clarke ......................... 106/789 |
| 5,131,473 A | | 7/1992 | Fischer ........................ 166/373 |
| 5,176,219 A | | 1/1993 | Cole et al. ................... 166/290 |
| 5,196,124 A | | 3/1993 | Connor et al. .............. 210/679 |
| 5,311,945 A | | 5/1994 | Cowan et al. .............. 166/292 |
| 5,351,759 A | | 10/1994 | Nahm et al. ................. 166/293 |
| 5,383,521 A | | 1/1995 | Onan et al. .................. 166/293 |
| 5,509,479 A | * | 4/1996 | Emmons ...................... 166/265 |
| 5,588,488 A | | 12/1996 | Vijn et al. .................... 166/293 |
| 5,624,493 A | | 4/1997 | Wagh et al. ................. 106/817 |
| 5,645,518 A | | 7/1997 | Wagh et al. ................. 588/252 |
| 5,725,055 A | * | 3/1998 | Schirmer et al. ........... 166/264 |
| 5,830,815 A | | 11/1998 | Wagh et al. ................. 501/155 |
| 5,842,518 A | | 12/1998 | Soybel et al. ............... 166/287 |
| 5,846,894 A | | 12/1998 | Singh et al. ................. 501/155 |
| 5,894,897 A | | 4/1999 | Vail, III ....................... 175/318 |
| 5,900,053 A | | 5/1999 | Brothers et al. ............ 106/678 |
| 6,158,617 A | * | 12/2000 | Hershey et al. ................. 222/1 |

\* cited by examiner

*Primary Examiner*—Paul Marcantoni
(74) *Attorney, Agent, or Firm*—Gemma Morrison Bennett

(57) ABSTRACT

Canister, sealing method and composition for sealing a borehole. The canister includes a container with slurry inside the container, one or more slurry exits at one end of the container, a pump at the other end of the container, and a piston inside that pushes the slurry though the slurry exit(s), out of the container, and into a borehole. An inflatable packer outside the container provides stabilization in the borehole. A borehole sealing material is made by combining an oxide or hydroxide and a phosphate with water to form a slurry which then sets to form a high strength, minimally porous material which binds well to itself, underground formations, steel and ceramics.

14 Claims, 11 Drawing Sheets

CANISTER, SEALING METHOD AND COMPOSITION FOR SEALING A BOREHOLE

This application claims benefit of Provisional Patent Application Ser. No. 60/131,752 filed Apr. 30, 1999.

TECHNICAL FIELD

This invention relates to methods of sealing or stabilizing boreholes and compositions for sealing or stabilizing boreholes.

This invention was made with government support under Contract Nos. W-7405-ENG-36 and W-31-109-ENG-38 awarded by the U.S. Department of Energy. The government has certain rights in the invention.

BACKGROUND ART

When holes are being drilled for exploration, rock and soil sampling, water, oil, gas, or geothermal developments, there is often a need to seal or stabilize the walls of the borehole, cement in casing pipes, or seal portions of the well at some depths while other portions at other depths are treated or produced. Drilling programs for multilateral, horizontal or deviated wells often require that portions of a wellbore be sealed or plugged. Also, after casing, the elbow areas where lateral wellbores depart from the vertical hole are often the site of loss of fluids into the surrounding formation. This fluid loss is often caused by high pressures encountered in the deviated production path, and exacerbated by mechanical failures of bonding materials at the lateral junction.

Drilling-related problems such as lost circulation, water shutoff, and swelling, sloughing or caving of the borehole walls have been dealt with by introducing various materials into the borehole to seal or stabilize the borehole, or to clog pores or fractures in the surrounding rock formation or to fill and stabilize cavities or washouts. These materials include various fibrous materials added to the drilling fluid or cement compounded with various additives.

Generally, cement-based materials do not bond well to the earth materials penetrated by the borehole and often do not stay in place. In addition, there are often problems getting these materials applied at precisely the desired depths and adapted to the particular downhole conditions in the trouble zone, particularly in severe lost circulation situations where cement materials tend to be overdisplaced away from the near-wellbore region. Further, with cement-type materials there can be difficulty judging appropriate pumping times and setting times at the elevated temperatures that are encountered in geothermal or very-deep petroleum drilling situations.

Furthermore, if the formation or fracture zone is severely underpressured or the formation contains large open porosity (e.g., interconnected large solution cavities in limestone formations), sealing the trouble zone by injecting cement from the surface is often unsuccessful. It is often unsuccessful no matter how many times the sealing operation is repeated because the hydrostatic head of the cement slurry causes the cement to be overdisplaced (i.e., carried away) from the near-wellbore region where the sealing is desired.

Another common approach used when there is a need to seal the borehole at certain depths while drilling is to circulate drilling fluid (mud) containing lost-circulation material to effect a temporary-to-permanent seal of the borehole wall as the drilling fluid permeates the formation or fracture zone. However, fibrous lost-circulation materials being carried in the drilling fluid may not adequately bridge-off the fractures or fill the open porosity because of the large outward pressure gradient from the overpressured borehole into the severely underpressured formation. This condition is referred to as severe lost circulation.

When there is a need to stabilize poorly consolidated or loose and friable formations at certain depths, where caving or sloughing produces cavities ("wash-outs") and attendant borehole stability problems, this again has traditionally been done by pumping portland cement from the surface to fill and stabilize the borehole. Subsequently, the borehole is redrilled through the soft cement plug and drilling then continued. However, since portland cement does not adhere well to most geologic materials, the typical result is to "wash" the cement out of the borehole and cavity while redrilling. With the cement washed out of the borehole, the cavity is reopened and additional caving or sloughing occurs. Then, the cementing operation is repeated over again until either a good plug is finally established, or the operator finally resorts to running and cementing a string of steel casing pipe through the trouble zone. Running casing reduces the size of the hole that can be drilled below the cased-off interval.

When there is a need to stabilize and support the wellbore at certain depths where squeezing (i.e., plastic deformation and flowing of formations such as serpentines or plastic clays) is encountered, the only engineering solution has been to finish the drilling (often with multiple redrilling or reaming operations) as fast as possible, then run and cement a string of casing across the trouble zone. This remedial solution relies on the collapse strength of the casing to hold back the squeezing formation and reduces the size of the hole that can be drilled below the cased-off interval.

Similarly, when swelling clay (hydrating) formations are encountered in drilling, the standard remedial approach is to prevent water-based fluids from penetrating or reacting with the clays and causing swelling by: (a) forming an impervious "wall cake" on the wall of the borehole; or (b) adding potassium chloride to the drilling fluid to make it less reactive with the clays; or (c) switching to a hydrocarbon-based drilling fluid, which is, however, generally undesirable because of increased costs, difficulties of cleanup and environmental hazards. Again, casing off the trouble zone is a typical solution.

Thus there is still a need for effective ways of sealing, stabilizing or plugging boreholes under severe conditions. There is also a need for sealing, stabilizing and plugging materials with a capability for bonding tightly to earth materials, steel casing and to the sealing, stabilizing and plugging materials themselves. There is a further need for materials which can be tailored for the downhole conditions associated with the problem to be remedied and which can be applied to precisely the selected depths.

Therefore, it is an object of this invention to provide compositions and methods of making the compositions for effectively sealing, stabilizing or plugging boreholes at selected depths.

It is another object of this invention to provide compositions for sealing, stabilizing or plugging boreholes which can be tailored to the viscosities and setting temperatures mandated by downhole conditions without compromising the properties of the cured material.

It is a further object of this invention to provide compositions for sealing, stabilizing or plugging boreholes which bind well to the compositions themselves, underground formations, steel and ceramics.

It is yet a further object of this invention to provide compositions and methods of making the compositions for sealing, stabilizing, supporting and plugging lateral junctions in multilateral boreholes.

It is also an object of this invention to provide compositions and methods of making compositions for sealing, stabilizing or plugging applications in offshore drilling operations.

It is yet another object of this invention to provide methods of applying the invention compositions for sealing, stabilizing or plugging boreholes downhole.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a borehole sealant for sealing, stabilizing or plugging boreholes which is made by combining an oxide or hydroxide and a phosphate with water to form a slurry which then sets to form a high strength, minimally porous chemically bonded ceramic material which binds well to itself, underground formations, steel and other ceramics.

There has been invented a method of sealing, stabilizing or plugging boreholes using the invention sealant by extruding or otherwise applying an uncured slurry of the sealant into the place where a plug, seal or borehole stabilization is desired, then allowing it to cure in-situ.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

Figure 1:
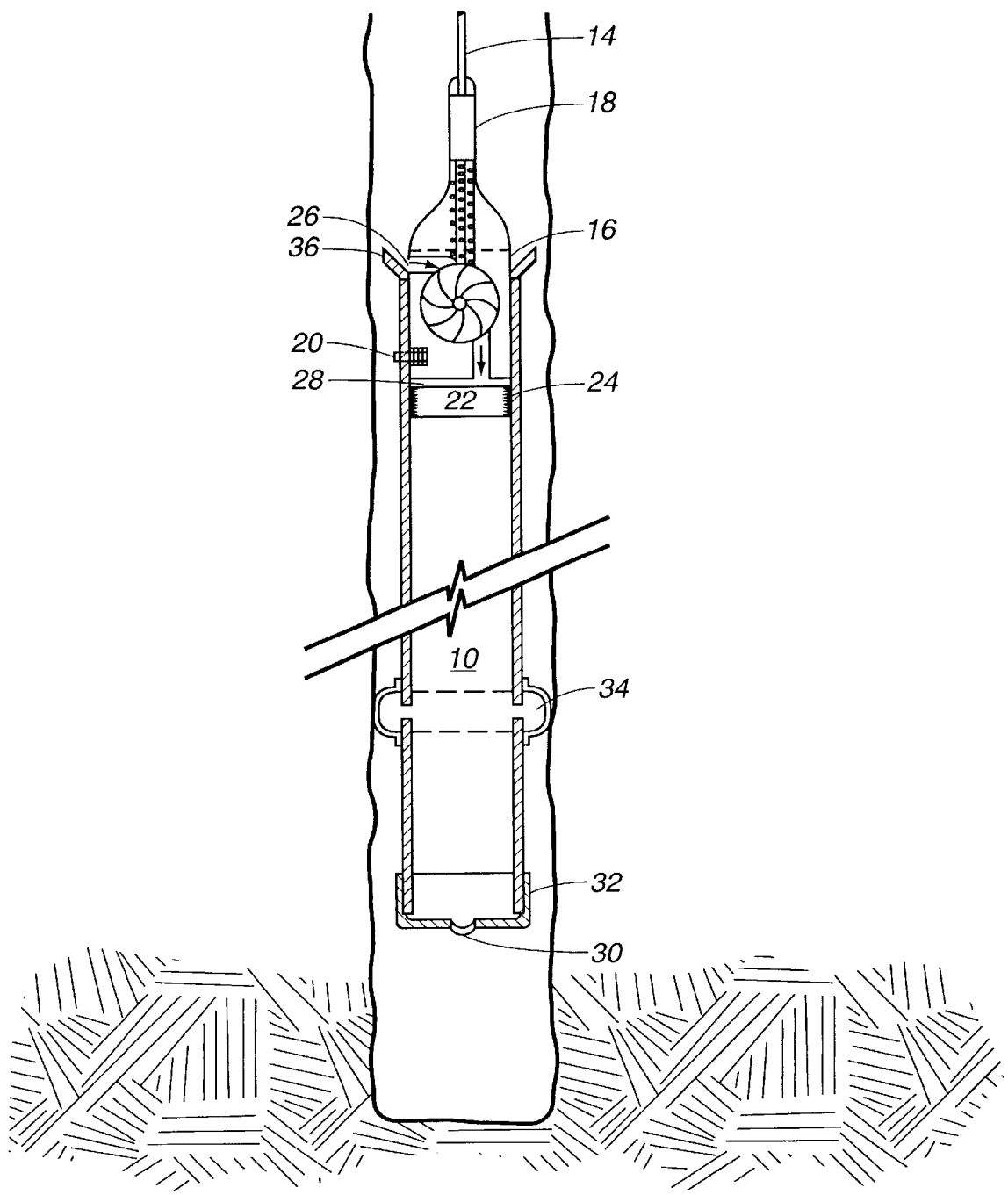
FIG. 1 is a schematic of an example of how the borehole sealant can be applied downhole using a canister lowered on a wire line.

A phosphate-based ceramic-like compound which can be used for sealing, stabilizing or plugging boreholes has been discovered. In the present invention, oxides or hydroxides of various elements are combined with phosphoric acid or water soluble phosphates to form a liquid slurry. The slurry is applied to a target area where it sets to form a sealant which is an effective nonporous seal, formation binder or borehole plug.

The formulations of the invention can be varied to obtain a broad range of selected slurry viscosities, setting times, and sealant properties.

By varying the cation in the chemical mixture of the invention or by adjusting the phosphoric acid content, a wide range of setting times at different temperatures can be achieved and controlled. The invention slurries will set up or cure even in water, drilling fluids and salt or sea water.

The downhole sealants of this invention adhere tightly to most types of rocks, including sands, shales, clays and limestone, and other earth materials typically encountered while drilling, even when the rocks are water-saturated and are at typical sub surface temperatures. The sealants will also adhere to steel wellbore casing materials and to other ceramics or the sealants themselves if placed sequentially in stages.

Oxides or hydroxides which are useful in the practice of the invention are those which are sparsely soluble and which do not react uncontrollably. Generally useful are oxides within the formula:

$$MO_{2x}$$

wherein M=a metal; and
x=a number equal to the valence of M.
Generally useful are hydroxides within the formula:

$$M_x(OH)_y$$

wherein M=a metal;
x=a number between 1 and 5; and
y=a number between 1 and 5.

Oxides and hydroxides which can be used in the invention include, but are not limited to MgO, MnO, Al(OH)$_3$, Al$_2$O$_3$, FeO, Fe$_2$O$_3$, Fe$_3$O$_4$, ZnO, Zr(OH)$_4$, ZrO$_2$, Y$_2$O$_3$, La$_2$O$_3$, VO$_3$, CrO, CoO, PbO, Nd$_2$O$_3$, TlO, TiO$_2$, CaSiO$_3$, crushed dibasic sodium phosphate crystals mixed with magnesium oxide, and mixtures thereof. CaO can also be used if it is used in combination with phosphates such as CaHPO$_4$. Presently most preferred are magnesium oxide and zinc oxide.

Oxides or hydroxides in powder form with particle sizes in the range between about 2 microns and about 100 microns are preferred because reaction rates of smaller particles are difficult to control and coarser particles result in slurries which are too viscous.

A stoichiometric amount of oxide or hydroxide relative to the amount of phosphate is preferable for efficient reactions.

An amount in the range from about 18 to about 60 weight percent, based upon total weight of oxide or hydroxide and phosphate, is generally useful in the invention. More preferable is an amount of oxide or hydroxide in the range from about 20 to about 50 weight percent. Generally presently preferred is an amount of oxide or hydroxide in the range from about 22 weight percent to about 34 weight percent. Use of too little oxide or hydroxide will result in slurries which are too acidic and corrosive to handle without damaging pumping and other equipment. Use of too much oxide or hydroxide will cause poor consolidation of the sealant.

It is believed that incorporation of the phosphates improves the bonding between the sealant and metal, previously applied sealant, sandstone or other oil-saturated earth materials because phosphate solutions act as detergents on oily surfaces and clean the surfaces on contact.

Phosphates which are useful in the practice of the invention are those which are soluble in water and which will result in the desired pH when the slurry is formed.

Generally, for most applications, a pH in the range from about 3 to about 9 is useful. Presently preferred is a pH in the range from about 6 to about 8.

Phosphates which are useful in the invention are those within the formula:

$$A(H_xPO_4)Y$$

wherein A=hydrogen or an alkali metal or ammonium ion;
x=a number from 1 to 5; and
y=a number from 1 to 5.

Presently preferred phosphates include, but are not limited to, phosphoric acid, potassium hydrophosphate, monopotassium phosphate, calcium hydrophosphate, sodium hydrophosphate, ammonium hydrophosphate, aluminum hydrophosphate, and mixtures thereof. Presently most preferred are potassium hydrophosphate and sodium hydrophosphate because these react well with alkaline oxides, react slowly enough to avoid overheating, but do not react too fast in setting up of the slurry.

An amount of phosphate sufficient to react stoichiometrically with the oxide or hydroxide is needed. An amount in the range from about 40 to about 82 weight percent, based upon total weight of oxide or hydroxide and phosphate, is generally useful in the invention. More preferable is an amount of phosphate in the range from about 50 to about 80 weight percent. Generally presently preferred is an amount of phosphate in the range from about 66 to about 78 weight percent. Use of too little phosphate will result in poor bonding properties of the sealant. Use of too much phosphate will result in slurries that are too acidic and which do not as readily set up or cure.

Phosphates in powder form with particle sizes of less than 100 micrometers are preferred because they dissolve in water easily and hence are more readily mixed. Coarser crystalline powders can also be used.

Water is used in the invention mixture, first as a means to form a slurry of the oxide or hydroxide powder and phosphate, then as a chemical component of the final sealant product which is a hydrated compound.

An amount of water sufficient to enable the reaction between the oxide or hydroxide and the phosphate and sufficient to achieve the desired slurry viscosity is needed. An amount in the range from about 25 to about 60 weight percent, based upon total weight of the slurry, is generally useful in the invention. More preferable is an amount of water in the range from about 30 to about 50 weight percent. Generally presently preferred is an amount of water in the range from about 30 to about 35 weight percent. Use of too little water may result in overheating of the slurry, overly rapid curing and poor bonding of the final product. Use of too much water will cause the slurry to not set or set very slowly.

The ceramic sealants of this invention can be used in virtually any chemical and thermal environment by adjusting the amounts of oxide or hydroxide and phosphates, balancing the pH and manipulating the setting rate, depending upon the proportion of hydrocarbons; amount of water and its chemistry and pH; and the formation or fluid temperature in the borehole to be sealed.

The oxide or hydroxide and phosphate components of the invention slurry can be combined by using any suitable method such as high-shear mixing, or ball milling of the powder components and mixing with the water.

The oxide or hydroxide and the phosphate can be combined first, then combined with the water, which can then be added in increments to achieve the desired viscosity and setting rate. Alternatively, either the phosphate or the oxide or hydroxide can be combined with the water first to form a slurry which is then combined with the remaining major component.

It is generally desirable to produce a slurry that is thin enough to be easily pourable or pumpable for transfer into and then subsequently out of canisters to be deployed downhole; or pumpable through coiled tubing for extruding onto the borehole surfaces to be sealed or stabilized or into the borehole interval to be filled or plugged; or through drill pipe and into the borehole interval to be sealed, stabilized or plugged.

The slurry has a viscosity which will enable the slurry to displace, both outwardly and upwardly, the water-based fluids in the wellbore with minimal intermixing of the two fluids.

Depending upon the efficiency of the mixing equipment, particle size, amount of water used, viscosity and temperature, mixing time can range from a matter of seconds to many hours. A mixing time sufficient to afford adequate contact of the components is required. Generally preferred are shorter mixing times in the range from about 5 minutes to about a half hour.

When it is desired to use additives, then the additives can be combined with either the phosphate or the oxide or hydroxide prior to forming of the slurry, combined with a mixture of the major components prior to forming of the slurry, or combined with a slurry of one or more of the major components.

Additives can be used as needed for facilitating the flow of the invention slurry, increasing the density of the final product, slowing down the curing time, enhancing the strength of the final product, or varying other properties such as porosity or permeability of the final product to tailor it to the specific environment in which it will be used.

Retardants to prevent the sealant from setting up too quickly can be incorporated into the invention mixture. Suitable retardants include acids such as boric acid, citric acid, oleic acid and commercially available organic retarders that contain some inorganic components, such as lignosulfonate. Commercially available retarders used in the cement industry can be used.

Depending upon the retardant chosen, the temperature of the site to be sealed, and the desired setting time, an amount of retardant in the range from greater than 0 to about 10 weight percent based on total weight of the slurry is generally useful in the invention. For example, in a slurry of 100 weight percent, 32 weight percent oxide, 51 weight percent phosphate and 16 weight percent water, 1 weight percent boric acid slows the setting rate at 90° C. to 20 to 30 minutes.

Compressive or flexural strength of the chemically bonded ceramic sealants of this invention can be enhanced by addition of reinforcing materials such as glass fibers; chopped glass strands; mica; silica; aramids; carbon fibers; alumina; hollow glass or silica spheres; perlite; vermiculite; metal fibers such as aluminum, bronze, zinc, nickel and stainless steel; synthetic organics such as polymer fibers and copolymers; silicate-containing materials such as fly ash; volcanic ash; sand; gravel; other aggregates; and mixtures thereof.

An amount of reinforcing material sufficient to achieve the desired improvement in flexural strength or compressive strength is needed. An amount in the range from greater than 0 to about 15 weight percent based on total weight of the slurry is generally useful in the invention. More preferable is an amount of reinforcing material in the range from about 0.5 to about 10 weight percent. Generally presently preferred is an amount of reinforcing material in the range from about 1 to about 5 weight percent. Use of too little reinforcing material will result in failure to achieve the desired flexural strength. Use of too much reinforcing material may cause undesirably high porosity.

Additives to decrease porosity and permeability can be used. Glass-forming silicates such as calcium silicate, sodium compounds, fly ash, acrylics and other polymer additives are useful, depending upon availability, particle size and desired porosity or impermeability. Presently preferred for decreasing porosity in the invention sealants is calcium silicate or class F or C fly ash because of their particular effectiveness in filling pores in the sealants.

An amount of permeability-decreasing material sufficient to fill enough open pores to achieve the desired low level of porosity is needed. An amount in the range from greater than 0 to as much as about 80 weight percent is generally useful in the invention for reducing porosity and filling the pores of the invention sealant, depending upon material selected, porosity of the sealant, and desired degree of impermeability. For example, when pure materials such as calcium silicate are used to decrease the sealant permeability, generally preferable is an amount in the range from about 2 to about 20 weight percent. When ashes are used, generally preferred is an amount of permeability-decreasing material in the range from about 10 to about 70 weight percent, based upon total weight of the non-aqueous components. Use of too little permeability-decreasing material will result in more porosity than desired. Use of too much permeability-decreasing material can result in sealants with less strength than desired.

Surfactants such as gas generating agents. metal oxide expanding agents, or calcium sulfate hemihydrates or mixtures thereof can be added to form a second phase in the invention slurries to increase the expansion of the slurries as they set or cure. Any of these surfactants are considered to be generally effective.

An amount of surfactant sufficient to give the desired amount of expansion of the slurry as it sets is needed. An amount in the range from greater than 0 to about 10 weight percent based upon total weight of the slurry is generally useful in the invention. More preferable is an amount of surfactant in the range from about 0.5 to about 5 weight percent. Generally presently preferred is an amount of surfactant in the range from about 1 to about 3 weight percent. Use of too little surfactant will result in lack of the desired amount of expansion. Use of too much surfactant may cause loss of strength in the cured sealant.

If desired for economic reasons or to thicken the slurries, any suitable filler material can be added to the slurry. Cuttings from the borehole, sand, soil, clay or mixtures thereof are presently preferred because of ready availability at most drilling sites and economy.

Typically the powdered components and any additives are premixed, bagged, transported to a drilling site, then combined with water to form the slurry. Alternatively, the components are transported to a drilling site where the slurries are mixed. Any of the additives can be added during mixing of the components, either by premixing with one or both of the powders or by mixing into the slurry.

The slurries of this invention are flowable, slightly expandable, and rapidly set up or cure into ceramic materials.

The ceramic downhole slurries of this invention have sufficiently high shear strength to withstand intact the rigors of being pumped and extruded. However, if desired, silicates or other additives can be incorporated into the slurry to alter the flow properties, facilitating flow of the slurry during pumping and extrusion.

The invention slurries are unaffected by the presence of salts, salt water, sea water or brine. Therefore, the invention slurries can be mixed on off-shore drilling platforms using available sea water.

The slurries of this invention will become more viscous when subjected to increased temperatures. Higher viscosity slurries are generally more useful so that the slurry will displace, rather than mix, with water or aqueous-based drilling fluid in the downhole environment.

Slurries for the sealants of this invention can be poured or pumped into canisters to be lowered down the borehole or drill pipe on a wireline or coiled tubing, or pumped through coiled tubing to the selected location, or pumped directly down through the drill pipe or borehole.

The slurries of this invention can be applied separately or simultaneously to the walls of the borehole to fill or plug the borehole, to the inside or outside surfaces of wellbore casing, or to layers of sealant which have already set.

When the slurry is placed using canisters, the filled canisters are lowered into the borehole to the selected depth on a wireline (electric logging cable) or coiled tubing. The canisters can be joints of HDPE on PVC pipe or other plastic or metal pipe adapted to contain the slurry, or any other suitably sized containers which can be fitted with burst diaphragms or other openings through which the slurry can be extruded and which can be either retrieved or drilled from the borehole. Presently preferred are plastic or resin canisters because the invention slurries do not bond to plastics or resins and can easily be extruded from plastic canisters. Plastic canisters are more easily drillable and sometimes preferred so that the drill bit can be guided as it drills through a canister left downhole. Canisters of HDPE are more flexible than PVC or metal and thus particularly suited for use in lateral wellbores. A canister sufficiently large to hold the total amount of slurry to be applied is generally preferred, unless sequential applications of the slurry are being applied or additional slurry is to be pumped from the surface down connecting coiled tubing.

Since electric wire line equipment is often already at the drilling site or readily available, it is generally preferred to use that marker of lowering a canister filled with invention slurry down the hole, or drill pipe if hole integrity is in question. The canister can be any suitable container with any suitable way of extruding the slurry from the canister. Generally a submersible pump and piston is needed to extrude the slurry and a burst diaphragm or other equivalent exit for the slurry is needed at the bottom of the canister.

In one example of a presently preferred embodiment of the invention, a submersible electric pump is attached to an electric wire line with the pump fitted to the upper end of the slurry-carrying canister which is lowered down a borehole. FIG. 1 is a schematic of a canister 10 in a borehole 12 on a wire line 14. The attachment of the wire line 14 to the pump 16 is by means of a wire line cable head 18 or other suitable attachment mechanism affixed to the leading end of the wire line 14. The attachment of the pump 16 to the cannister 10 can be any suitable release mechanism if it is desired that the wire line 14 and attached pump 16 be pulled from the borehole 12 without the canister 10 after the canister 10 is emptied. Presently preferred is use of an electromechanical release mechanism 20 which holds the pump 16 securely inside the top end of the canister 10 but which is readily released when it is desired to withdraw the wire line 14 and pump 16 from the borehole 12 after the slurry has been extruded into the open hole, leaving only the drillable canister 10 behind in the borehole 12.

In this embodiment of the invention, the pump 16 is preferably placed in the top end of the canister 10 above a wiper plug 22, piston or plate separating the slurry from water or drilling fluid above the wiper plug 22, piston or plate. The wiper plug 22, piston or plate will generally have seals 24 around its circumference as needed. The pump 16 draws drilling fluid or water from the borehole 12 above the canister 10 through an inlet port 26 to pump down against the top of the wiper plug 22, piston or plate on top of the slurry in the canister 10, thereby extruding the slurry from the canister 10. A gap or space 28 between the pump 16 and the top of the wiper plug 22, piston or plate permits inflow of pressurized drilling fluid, mud, or water from the pump 16.

A relatively small pump can be used since the pressure is needed only to push the slurry from the canister through the burst diaphragm or other exits onto the surfaces to be sealed or stabilized or into the hole to be plugged. It is important, however, that a pump capable of pumping fluids with particulate matter be used since it is desired to be able to pump either drilling fluid which may have cuttings or to pump water which may have particulate additives. Depending upon the volume and consistency of the slurry and the hydrostatic pressure of the formation or drilling fluid where the seal or plug is to be applied, a pump capable of pumping from about 50 to about 200 psi is generally useful.

As shown in FIG. 1, the canister 10 has a burst diaphragm 30 attached to or built into the end cap 32 as shown in FIG. 1. Alternatively, valves or other suitable slurry exits as a way of allowing the sealant to be released or extruded from the canister can be used. If desired, these may be positioned on all sides near the bottom of the canister to disperse the slurry more evenly about the borehole walls. When a burst diaphragm 30 is used, fluid pressure can be used to open the burst diaphragm 30 and extrude the sealant from the canister 10.

Generally, the burst diaphram 30 is in an end cap 32 (which contains the slurry in the canister) or other stop mechanism attached to the bottom of the canister 10. The end cap 32 prevents the wiper plug 22, piston or plate from overdisplacing the slurry by stopping the wiper plug 22, piston or plate at the bottom end of the canister 10 to prevent the pump 16 from pumping drilling fluid or water through the canister 10 and into the borehole 12.

A low-pressure inflatable packer 34 installed around the outer circumference of the canister may be employed to centralize the canister 10 in the borehole 12 and to prevent slurry being extruded from the lower portion or bottom of the canister 10 from backing up around the canister 10 and upward in the borehole 12. The inflatable packer 34 can be inflated after the canister 10 is positioned downhole by the same pump pressure being used to extrude the slurry, and deflated after the slurry is placed by using the depressurization of the slurry or drilling fluid or by any other suitable means.

After the slurry has been extruded from the canister, the canister can be withdrawn from the borehole and, if needed, refilled with more slurry and run into the borehole again to augment the slurry previously placed.

However, if the canister is sealed in the borehole or for some other reason it is desired to leave the canister down hole, this can be done. This is generally practical because when the slurry sets up in the hole where it was extruded, it generally seals the canister 10 in place, with the canister 10 centralized in the borehole if an inflatable packer 34 is used at the lower end of the canister 10. After the pump 16 is detached, it is withdrawn from the hole along with the wire line 14 by use of an electromechanical release mechanism 30, or other detachable or release mechanism. The top of the canister generally can be fitted with a conical drill bit re-entry guide 36 which also serves to centralize the top of the canister 10 in the borehole 12. A guided bore centralized drilling assembly, fitted on bottom with a small-diameter "stinger" designed to fit inside the top of the plastic canister, is run into the hole. The conical re-entry guide 34 fitted to the upper end of the canister serves as a guide for a drill bit, or, more particularly, a drill bit fitted with a stinger, to drill down through the canister rather than being deflected into a deviated drilling path by a canister and set-up slurry which can be harder than the surrounding formation. The sealant-stabilized trouble zone is then drilled out.

In another presently preferred embodiment of the invention, a slurry-carrying canister, with a submersible electric pump affixed to the upper end, is lowered inside the drill pipe to the bottom of the drill string on an electric wire line. This application of the invention can be used when it is preferable to leave the drill pipe in an unstable hole, such as when drilling through rapidly caving or sloughing formations, or where severe lost circulation is encountered with zones of squeezing or swelling clays or other plastically deforming formations occurring above a loss zone.

Figure 2:
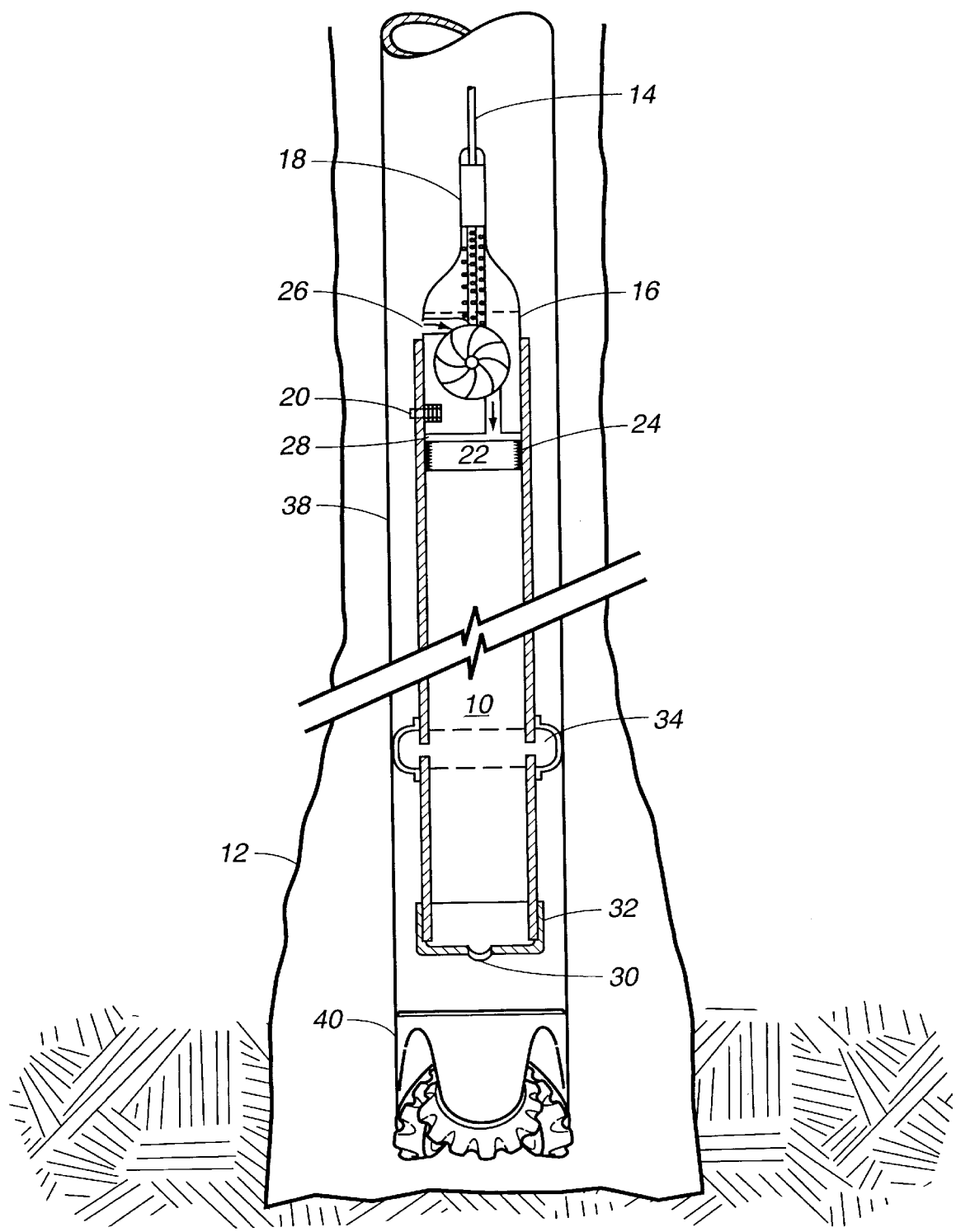
FIG. 2 is a schematic of use of a canister on coiled tubing to apply the invention sealant in an underreamed section of a wellbore in a zone of swelling or squeezing clays or plastically deforming materials.

An example of this embodiment of the invention is shown schematically in FIG. 2. A slurry-containing canister 10 is lowered down the inside of the drill pipe 38 on an electric wire line 14 to a position just above the drill bit 40. The attachment of the bottom of the electric wire line 14 to the top of the pump assembly 16 is by a cable head 18 which contains electric pass-throughs.

The attachment of the pump assembly 16 to the canister 10 can be by any suitable attachment mechanism 20. The pump 16 draws drilling fluid or water from inside the drill pipe through the inlet port 26 and applies pressure to the wiper plug 22, piston or plate, displacing the wiper plug 22, piston or plate downward thereby pressurizing the slurry and bursting the burst diaphragm 30 or other suitable pressure-opening mechanism built into the end cap 32 of the canister 10.

The slurry is forced through the fluid jets of the drill bit 40 and into the borehole 12, sealing or plugging the lost-circulation zone or filling and stabilizing the caving and washed-out borehole interval. Displacement of the slurry up and around the canister 10, in the annular space between the canister 10 and the inside of the drill pipe 38, can be prevented by a circumferential pressure-actuated inflatable-packer 34 attached to the outside of the canister 10 which seals this annulus.

The end cap 32 attached to the bottom of the canister 10 contains the slurry in the canister and prevents the wiper plug 22, piston or plate from overdisplacing the slurry by stopping the wiper plug 22, piston or plate at the bottom end of the canister 10 to prevent the pump 16 from pumping drilling fluid or water through the canister 10 and drill bit 40, and into the borehole 12.

After the slurry has been extruded through the jets in the drill bit 40 and into the borehole 12 but before the slurry starts setting up, the drill pipe 38 is lifted up several tens of feet off the bottom of the hole, or above the depth of the trouble zone, and then the empty canister 10 and attached pump assembly 16 are withdrawn from the drill pipe 38. If additional quantities of slurry are required (e.g., to fill a large washed-out interval of the hole), the above operations can be repeated one or more times with a refilled canister, again run through the drill pipe on a wire line.

Coiled tubing is the basis of three other methods of applying the invention sealants: (a) use of coiled tubing to lower a filled canister; (b) use of coiled tubing to lower a filled canister and provide additional flow of invention slurry into the canister; and (c) use of coiled tubing without a canister to provide a flow of invention slurry downhole.

"Coiled tubing" refers to a flexible steel tube, with a diameter from about ⅝" to about 2" and a length exceeding the depth to which the tube is to be inserted in the borehole or inside the drill pipe, which is rolled up on a large diameter spool. In methods (a) and (b), a canister containing the slurry is attached to the leading end of the coiled tubing.

The coiled tubing is unrolled from the spool as it is put down either the wellbore or down through the string of drill pipe. If there is risk of cave-in of the wellbore, then it may be desirable to leave the string of drill pipe down the hole and put the coiled tubing with or without a canister down the drillstring and extrude the sealant out through the jets in the bit. In either case, with or without a canister, when operating inside drill pipe, there needs to be a provision, either mechanical or hydraulic, to seal the annular gap between the canister or coiled tubing and the inside diameter of the drill pipe so that the sealant does not flow upwards past the canister rather than downward and out through the jets in the drill bit.

Figure 3:
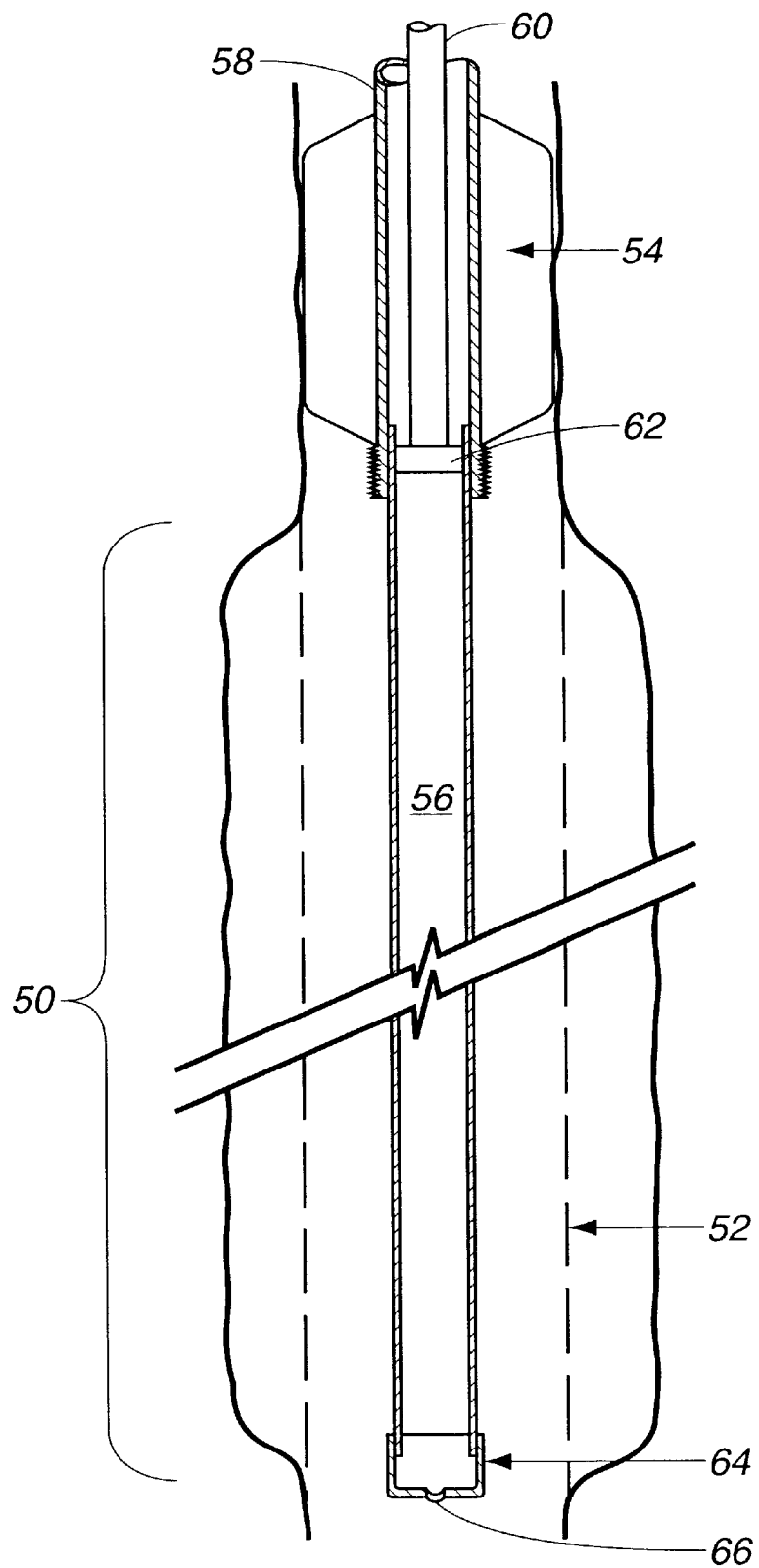
FIG. 3 is a schematic showing a canister run on coiled tubing to apply the invention sealant in a wellbore with caverns or washouts.

FIG. 3 shows an example of the use of a canister on coiled tubing to apply the invention sealant to form a ceramic "casing" which adheres to, penetrates, and lines the inside diameter of the borehole. In this example, a zone of swelling or squeezing clays or plastically deforming serpentine formation is stabilized and repaired using the invention apparatus and an invention method. First, the trouble zone 50 is underreamed from the initial diameter of the drilled wellbore 52 using any suitable drilling equipment known in the art to form an underreamed section of wellbore, also 50. After removing the underreaming assembly from the hole, an open-ended full-gauge blade reamer assembly 54 is run in the hole to the top of the trouble zone 50 to be stabilized.

Then a drillable canister 56, similar to that described above and shown in FIG. 2 is filled with slurry and lowered through the drill pipe 58 and reamer assembly 54, which extends only to the top of the underreamed section of wellbore 50. The top of the canister 56 is attached to a small-diameter coiled tubing 60 using a running and release mechanism 62 with one or more shear pins or any other suitable release mechanism.

The lower end of the canister 56 is fitted with an end cap 64 having thereon a burst diaphragm 66. The slurry is extruded through the burst diaphragm up and around the canister 56 into the underreamed section of wellbore 50.

After the slurry is extruded from the canister 56 and allowed to partially set up, the coiled tubing release mechanism 62 is activated and the coiled tubing 60 is withdrawn from inside the drill pipe. Then, the drill pipe 58 with the blade reamer assembly 54 is removed from the borehole before the slurry sets up further and binds the blade reamer assembly 54 in the borehole. The canister 56 is left downhole.

The canister 56 is subsequently used as a guide for redrilling the borehole as explained in the description of FIG. 1. After the slurry has had time to set up, but is not yet completely cured into a difficult-to-cut ceramic, a guided-bore centralized drilling assembly, fitted on bottom with a small-diameter "stinger" designed to fit inside the top of the canister, is run into the hole and the sealant-stabilized trouble zone is drilled out to the full borehole diameter. After withdrawing the guided-bore drilling assembly from the borehole, the drilling program can be resumed below the ceramic "cased" trouble zone.

Figure 4:
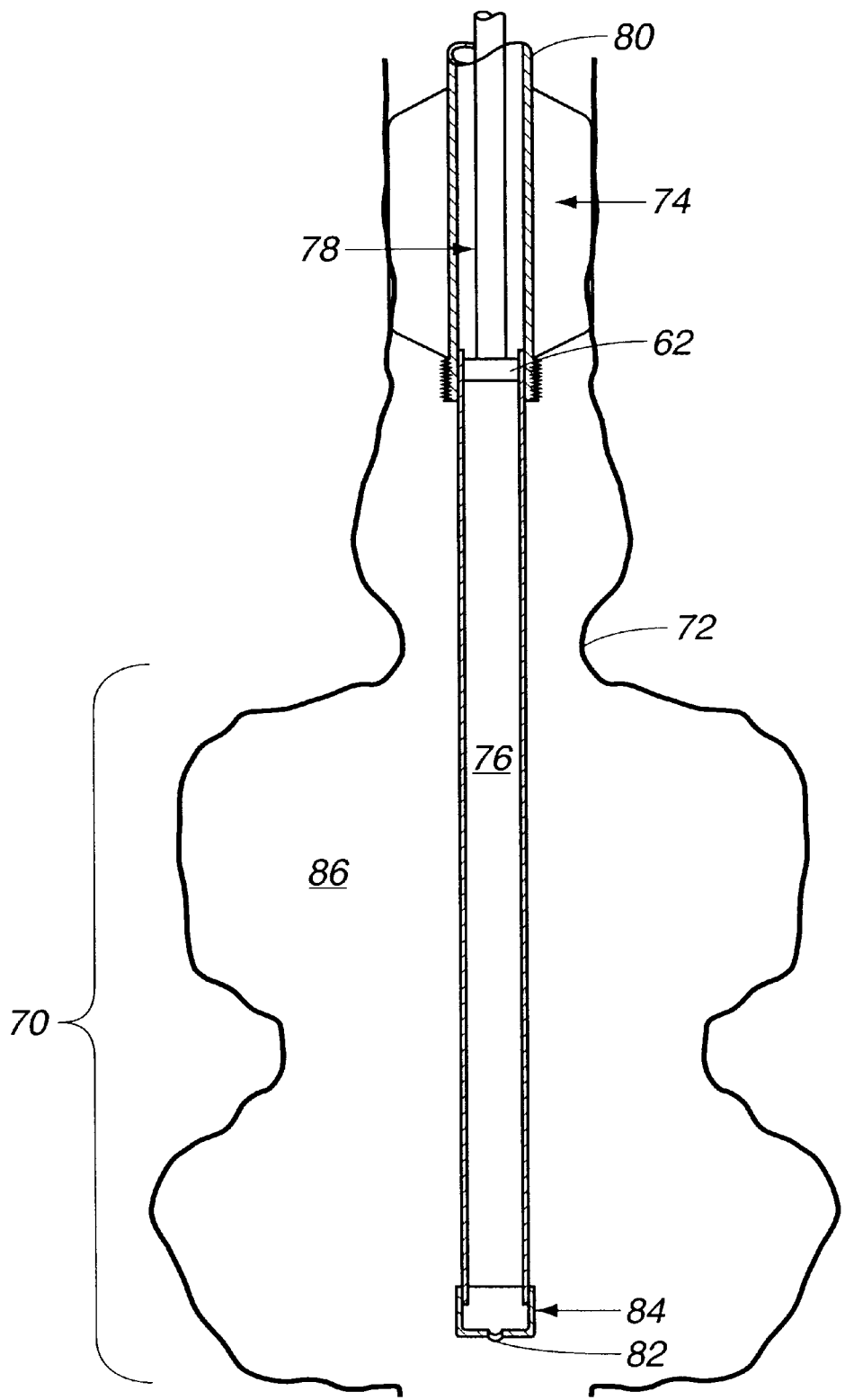
FIG. 4 is a schematic representation of the invention repairing a zone of a loose formation in which a cavern or washout has occurred.

FIG. 4 shows use of the invention apparatus and the method described with regard to FIG. 3 for stabilizing and repairing a zone of unconsolidated, loose, or friable formation in which caverns or wash-outs have occurred. In FIG. 4 there is shown a zone of caving 70 with wash-outs which is partially bifurcated by a layer of harder rock 72 in a borehole. An open-ended full-gauge blade reamer assembly 74 or any other suitable tool is used to centralize the drillstring just above the wash-out zone.

A drillable canister 76 filled with invention slurry is then lowered down the drillstring on a small-diameter coiled tubing 78 filled with enough additional slurry (with a wiper plug on top) to approximately fill the cavernous zone when extruded from the bottom of the canister by pressurizing the coiled tubing from the surface. The canister 76 is sized so that it passes through the open end of the drilling assembly and is long enough to reach the bottom of the trouble zone.

The canister 76 is rapidly lowered on the coiled tubing 78 through the drill pipe 80 to the bottom of the caving zone 70. The coiled tubing 78 is pressured up enough to open a burst diaphragm 82 in an end cap 84 on the lower end of the canister 76, thereby extruding the slurry out the bottom of the canister and back up around the outside of the canister, filling the annular gap 86 between the canister and the cavernous borehole wall. The small inside diameter of the canister 76 and the smaller inside diameter of the coiled tubing 78 affords a very accurate control of the volume of the slurry extruded so that the cavernous interval 70 can be completely filled, but not overfilled.

After allowing sufficient time for the slurry to set up, the coiled tubing 78 is released from the canister 76 using any suitable technique, such as shear pins or a pressure-activated release mechanism, and removed from the borehole. The canister 76 is left downhole and the drill pipe 80 and blade reamer assembly 74 are then removed from the borehole. Finally, a guided bore centralized drilling assembly, fitted on bottom with a small-diameter stinger designed to fit inside the top of the plastic canister, is run into the hole and the sealant-stabilized trouble zone is drilled out.

Alternatively, the coiled tubing without a canister is run to the selected depth through open-ended drill pipe and the invention slurries are pumped down and out of the coiled tubing to seal or stabilize the walls of the borehole or into the drilling fluid in the borehole to form a plug filling the borehole.

When the slurry is pumped from the surface through a small-diameter coiled tubing which is fitted with a check valve or similar device on bottom, and extruded at the trouble zone, another significant advantage of the invention accrues. Since the interior volume per unit length of small-diameter coiled tubing is very much smaller than the corresponding volumes of either the borehole or the drill pipe, a very considerable control over the exact amount of slurry applied to the trouble zone is gained.

In addition, when using coiled tubing, if the trouble zone involves severe lost circulation, the slurry can be "pumped" down the coiled tubing and then extruded from the bottom of the coiled tubing using a combination of compressed air and water as the motive force, so that the very significant overpressure due to the hydrostatic head of a corresponding column of pressurizing water inside the coiled tubing can be avoided. This avoidance of overpressuring a zone of severe lost circulation permits the slurry to stay in its intended location in the borehole as it sets up rather than being overdisplaced much farther out into the formation or fracture zone, as commonly happens when cement is pumped down drill pipe from the surface.

A wiper plug can be inserted above the slurry to give a pressure pulse when the air- or fluid-driven plug hits bottom, thereby signaling the driller that the slurry has all been extruded out the bottom of the coiled tubing.

In another alternative embodiment of the invention, the drill pipe may be removed from the borehole and the naked coiled tubing put down the borehole. An additional advantage accrues when running coiled tubing naked into a borehole. Because of the small diameter of the coiled tubing, it can more easily be "washed" to bottom or to the location of the trouble zone by the pressurized jet of drilling fluid being pumped out the end of the coiled tubing.

Generally, except for very shallow boreholes, it is much more effective and safer, and also less costly, to place the slurry at the trouble zone through coiled tubing or by extruding the slurry from a canister run on coiled tubing or on an electric wire line. This is because of the increased accuracy and ease of placement using these methods as compared to direct openhole or drill pipe placement of the slurry by pumping from the surface.

However, in some exceptional circumstances such as when it is necessary to quickly stabilize a hole that is caving in order to save the hole, or when there is a dramatic loss of circulation and there is no coiled tubing equipment or wire line with a sealant canister at the rig site, the invention slurry can be pumped directly down the borehole or, more preferably, down the drill pipe. If the sealant is to be applied by pumping slurry directly down the drill pipe, it is generally preferable to pump in the selected amount of slurry (for example, about 200 gallons), then put in a wiper plug after the slurry. Drilling fluid or a mixture of drilling fluid and water is then pumped in above the wiper plug to push the slurry down the drill pipe and through the jets in the drill bit if the drill bit has not been removed from the drill string. To maintain the subhydrostatic pressure that is needed to prevent overdisplacement when dealing with a severe lost-circulation problem, compressed air can be applied on top of the drilling mud and water above the slurry, to reduce the hydrostatic head of the fluid in the drill pipe.

After the placed slurry has had time to set up, it may be possible to dissolve the sealant out of the drill bit jets with acid if the bit was on the drill string when the slurry was put down the hole. More likely, the drill bit may have to be sacrificed. If there was no drill bit on the drill string or if the slurry was pumped directly down the hole without the drill string, then the hole is redrilled as it would be if it had been plugged with cement.

Whatever placement method is used, after application to the location where the seal, wellbore stabilization, or plug is desired, the slurry sets up or cures in place. The invention slurries can set up or harden even in an aqueous environment, such as in a wellbore filled with a water-based drilling fluid. Setting of the invention slurries appears not to be sensitive to hydrocarbons or saline environments that occur in some drilling operations.

The slurry sets up to form the sealant in the open borehole, or between a steel pipe or casing set in the borehole and the surrounding formation, or between two separate concentric steel pipes installed in the borehole and the surrounding formation, or between itself and previously set-up stages of slurry in the borehole, depending upon the purpose for using the sealant and where it is extruded. The slurry expands slightly and tightly adheres to and adsorbs into and seals any open fractures within the surrounding formation that intersect the wall of the borehole or any open porosity in the surrounding formation, thusly forming a tight seal in the pores or fractures in the formation, between the formation and casing, or between casings, or tightly adheres to previously set sealant. It also bonds to the steel pipe or casing, forming an impervious and structurally sound seal with mechanical support characteristics superior to those of portland cement.

Curing times can range from as little as a matter of minutes to a number of hours. For most invention slurries at ambient temperature and pressure, and depending upon whether curing retardants are used and the amounts of retardants used, the curing time generally ranges from about 20 minutes to about four hours.

Figure 5:
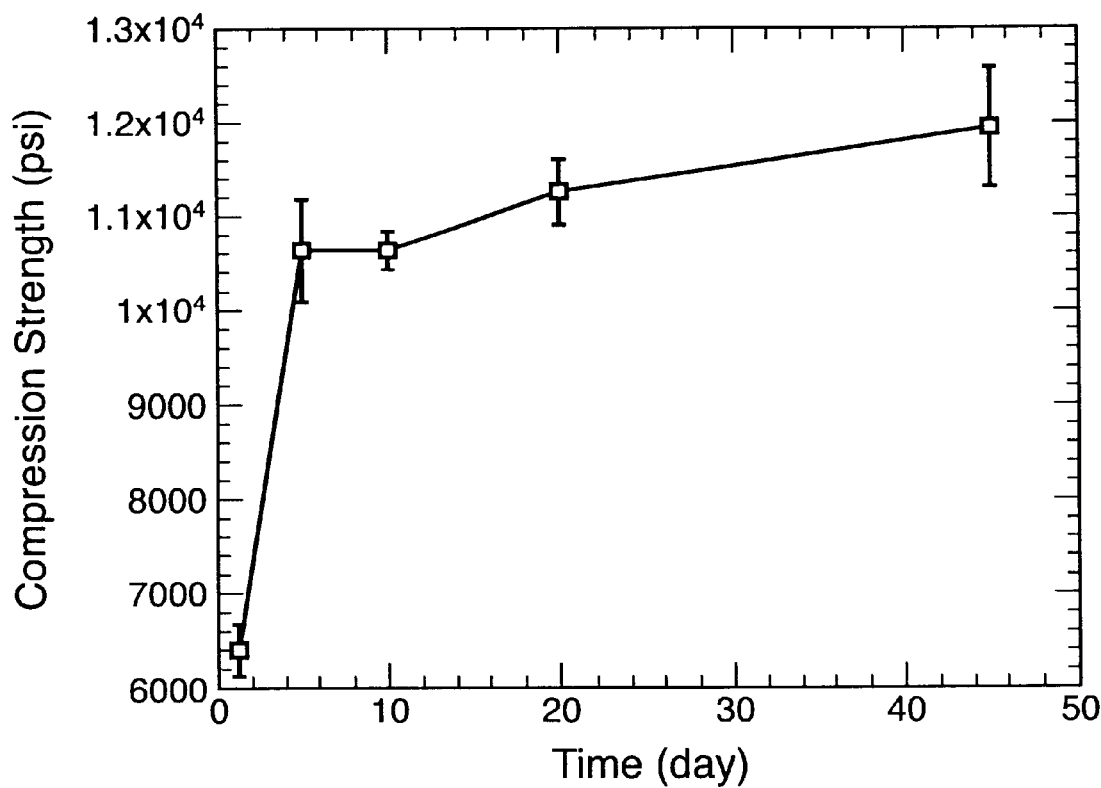
FIG. 5 is a graph of compression strength of an invention slurry as a function of time.

FIG. 5 is a graph of the increase in compressive strength of the invention sealant as a function of time. It can be seen that there is a dramatic increase in the compressive strength during the first five days after the sealant has begun to solidify. As the sealant continues to cure, the increase in compressive strength is more gradual, although continuing improvements have been observed for times up to 45 days or longer.

The invention sealants have compressive strengths between about 3500 psi and 12,000 psi, depending upon whether a second phase material is added and, if so, depending upon how much and which material is used. The compressive strengths of the invention sealants compare favorably with that of conventional cement which has a compressive strength of about 4000 psi.

The chemically bonded ceramic sealants of this invention have covalent and ionic bonding, and hence are very hard ceramic materials. They are insoluble dense solids when set up and are durable in high temperature and corrosive environments.

The invention sealants have porosities in the range from virtually 0 to about 5 percent, depending upon particle sizes of the powders used and, if used, the kinds and particle sizes of fillers. This porosity is much lower than the typical porosity of portland cement, which generally has a porosity in the range from about 10 to about 20 percent. The set material has a generally nonporous finish and is impermable to liquids including aqueous-based and hydrocarbon liquids and gases.

The invention sealants are environmentally safe because all components used in the slurries which set to form the sealants are inorganic and nonhazardous oxides or hydroxides. They are either conventional powders or phosphates typically used in fertilizers and detergents. There are no clean-up problems associated with the invention sealants because the invention sealants are readily soluble in either phosphoric acid or commercially available acids such as hydrochloric or sulfuric acid solutions with low pH. Sealants which are drilled arrive at the surface as small particles or chips along with any cuttings in the drilling mud recirculated to the surface.

This invention provides methods and sealant materials to effectively accomplish the cementing of casing, fluid diversion, borehole wall sealing, borehole wall stabilization, and borehole plugging in vertical, deviated or horizontal wells on and offshore. The downhole sealants of this invention can be used to solve wellbore problems during the drilling and completion of oil, gas, geothermal, water and other types of wells.

Borehole walls can be unstable due to either continual caving or sloughing of the poorly consolidated or loose and friable sediments or volcanics (e.g., soft pumice deposits) being drilled, or formations being comprised of swelling or squeezing clays or plastically deforming serpentines. Swelling or squeezing clays or plastically deforming serpentines can severely reduce the borehole diameter or completely close off the borehole in less than a day of time, making repair and stabilization of the borehole mandatory before drilling can continue. Often, when these difficult drilling situations are encountered, the only currently satisfactory remedial operation is to run and cement a string of casing through the trouble zone as quickly as possible. However, in deep offshore drilling situations in particular, the running of an additional string of casing can add millions of dollars to the cost of a single production well. Embodiments of the invention such as that shown in FIG. 3 can be used to place a ceramic casing through the trouble zone, thereby solving these types of problems.

In another problem solved by use of the invention, the walls of a borehole which is being drilled through an unconsolidated, loose, or friable formation, have caved in to form caverns or wash-outs. The washed-out borehole needs to be stabilized and then filled with sealant before drilling can proceed. An example of this situation is shown in FIG. 4 described above.

Another important application for the invention slurries and sealants is stopping loss of circulation and sealing lost-circulation zones, particularly if the pore pressure of the loss zone is significantly subhydrostatic (underpressured). If the formation is significantly underpressured and contains major fractures or caverns, or is extremely porous, drilling fluids can be rapidly lost out into the formation. With loss of circulation and hydrostatic borehole pressure, there is much less drilling fluid pressure to stabilize the borehole wall and no cuttings will be recirculated to the surface. With no circulation of cuttings, the chances of getting the drilling assembly stuck in the hole are greatly increased.

Rather than sometimes futile attempts to stop severe loss of circulation by putting lost-circulation materials into the drilling fluid or by attempting to cement the loss zone from the surface, a canister of invention slurry can be run down the borehole or the drill pipe on a wire line or on coiled tubing and extruded to seal up fractures, large pores or small caverns in the formation. If there are caving or swelling formations above the lost-circulation zone, the preferred sealing method (if the drillstring has been removed from the hole) is to run coiled tubing fitted with a nozzle on the downhole end. The small diameter coiled tubing can be used to wash its way down the borehole through the upper caving or swelling formations to the loss zone by using a jet of drilling fluid. Once the coiled tubing is at the loss zone, invention slurry mixed at the rig site to the selected viscosity can be pumped down the coiled tubing in whatever amounts and pressures are needed to seal or plug the lost circulation zone. Since the level of the drilling fluid in the borehole will typically be significantly below ground level but above the loss zone, the hydrostatic pressure of the slurry needs to be balanced with the hydrostatic head of the water and/or drilling fluid above the loss zone so as to not overdisplace the slurry. This can be accomplished by adjusting the amounts and pressures of the slurry being pumped down the coiled tubing. One way of controlling slurry extrusion pressure more exactly is to slowly pump air into the coiled tubing behind the slurry so as to slowly extrude the slurry without increasing the hydrostatic head of the slurry.

After the appropriate amount of slurry has been introduced into the lost circulation zone, the coiled tubing is pulled from the borehole before the slurry sets and binds the coiled tubing. If drilling is resumed before the sealant completely cures and is still softer than the surrounding formation, drilling usually can be resumed without use of additional equipment to centralize the drill bit.

If zones of water inflow are sequentially sealed in accordance with this invention during drilling, the borehole can be maintained at a significantly subhydrostatic pressure condition by using air, foam, or aerated mud as the drilling and circulating fluid, without the inflow of significant amounts of water. Then, underbalanced drilling methods using percussive drilling assemblies and downhole motors, deployed on either drill pipe or coiled tubing, can be employed to greatly increase rates of penetration and thereby reduce the overall costs of drilling programs.

The invention sealants are ideal for plugging holes for fluid diversion. Fluid diversion is a procedure or operation to promote uniform treatment of a long heterogeneous interval with two different treating fluids, each of which is directed sequentially to a different area in a well. Effective diversion is more difficult for a highly deviated or horizontal well than for a conventional vertical well. The combination of wellbore angle, formation type, interval length, and the existence of natural fractures complicates efforts to divert treatment fluids.

Fluid diversion is critical to the success of well treatments such as matrix acid treatments, matrix solvent treatments and water/gas shut-off treatments. An effective diversion technique is accomplished by plugging a zone temporarily, forcing the treatment fluids into other regions, and then removing the plug after the treatment. Plugs of sealants of the present invention can easily be removed by redrilling through the cured or partially cured sealant.

Figure 6A:
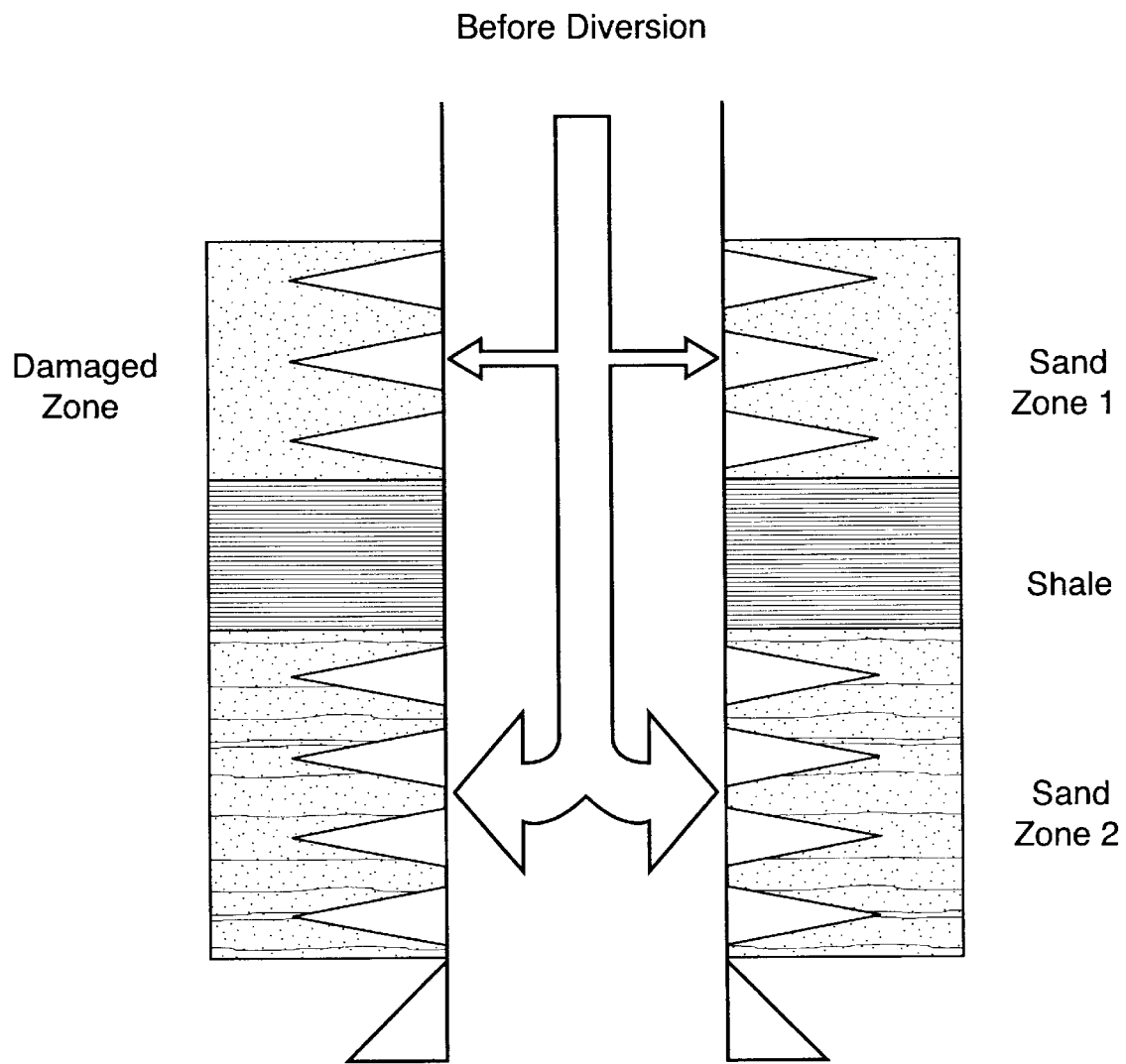
FIGS. 6a and 6b are schematics of diversion in a cased and perforated vertical well using the invention sealant and method of application.
Figure 6B:
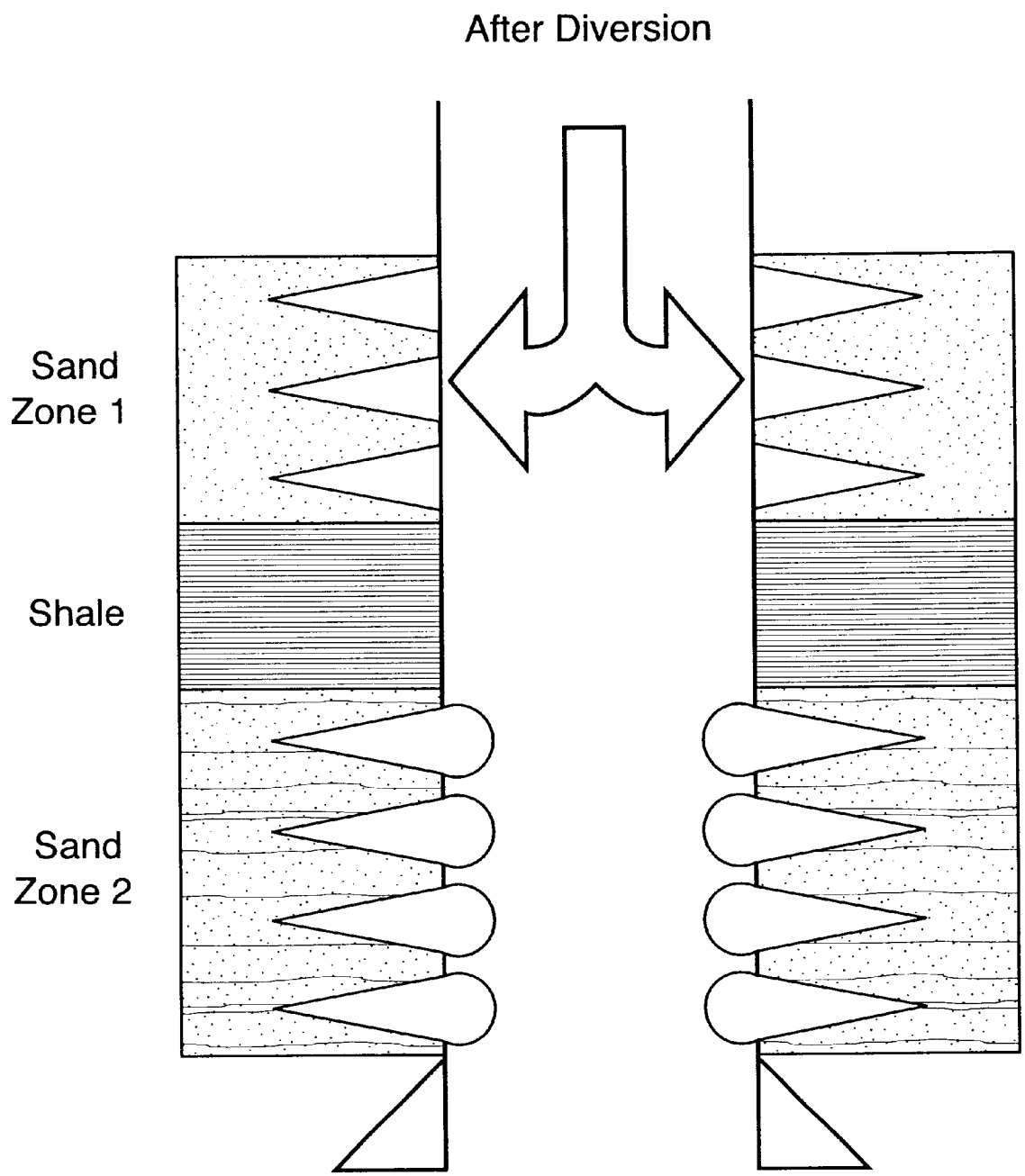

FIGS. 6a and 6b show a schematic of a diversion process in a cased and perforated vertical well. In FIG. 6a the major portion of the flow of treatment fluid is going past a first sand zone which is damaged, past a shale zone and going out into a second sand zone. In FIG. 6b, after the second sand zone has been plugged or sealed with invention sealant, the major portion of the flow of treatment fluid is diverted into the first sand zone.

Figure 7:
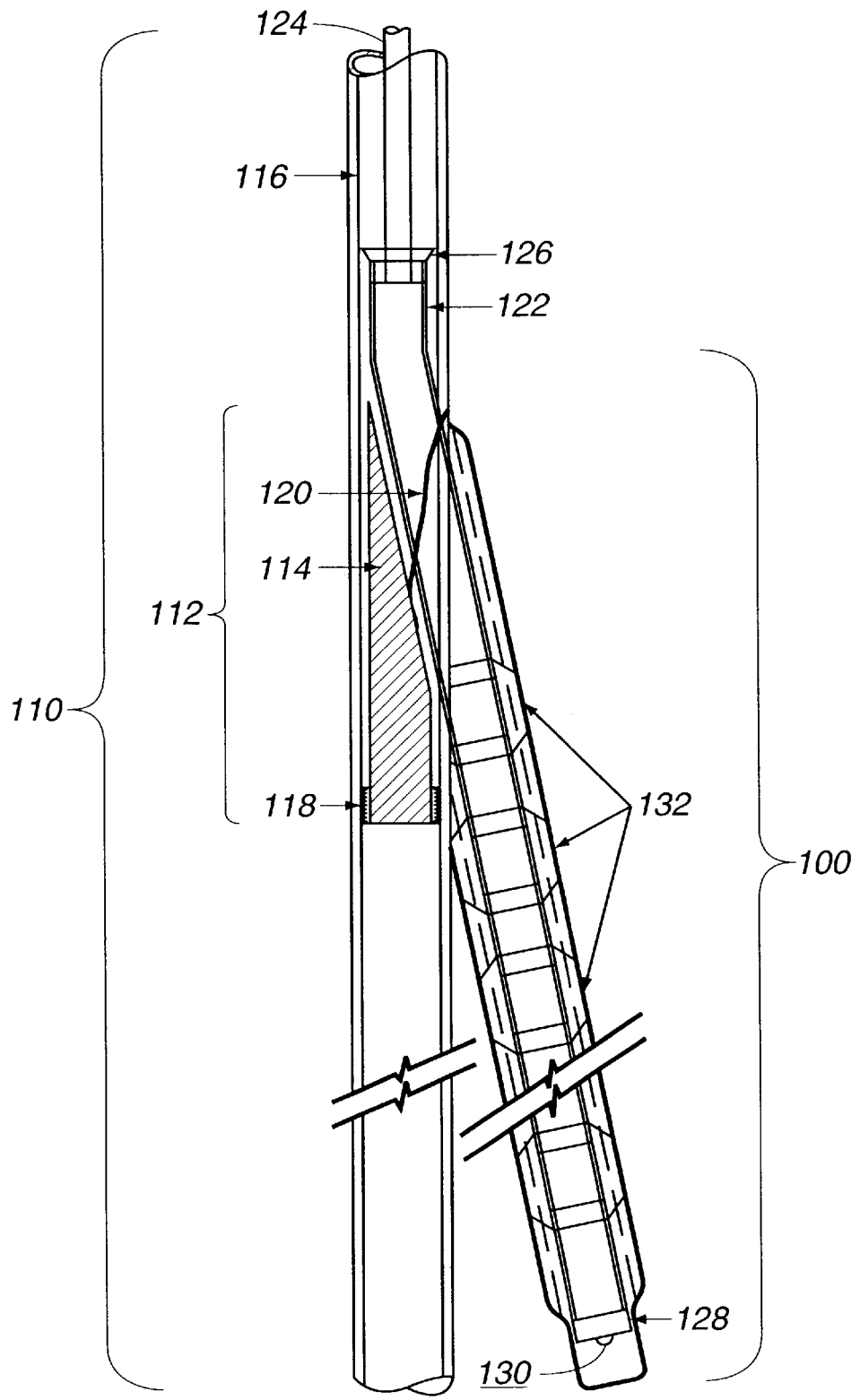
FIG. 7 is a schematic of a multilateral borehole showing the location where invention sealant is applied.

When invention sealants are used to both seal and support the junction of a lateral (deviated) wellbore with the primary wellbore in a petroleum or geothermal application, the slurry is extruded from a drillable canister which can be run on either a wire line or coiled tubing as shown in FIG. 7.

FIG. 7 is a schematic of a lateral wellbore 100 drilled from the cased main wellbore 110 within an interval 112. The junction of the lateral wellbore 100 with the main wellbore 110 can be constructed in the following manner. A retrievable whipstock 114, coated with non-stick plastic on its sides so that the invention slurry will not adhere to the whipstock 114 and bond it to the steel casing 116, is oriented and locked into the casing 116 with a suitable casing locking device 118 (e.g., an anchor) built into the lower part of the whipstock 114. A mill, run on drill pipe, is then run into the hole and using the whipstock 114 as a guide, a window 120 is cut in the steel casing 116 permitting the drilling of a lateral wellbore 100 only slightly smaller than the inside diameter of the cased main wellbore 110. Then, after removing the mill assembly used to cut the window 120, a stub of the lateral wellbore 100 is drilled some 30 to 60 feet out into the surrounding rock, again using the whipstock 114 as a guide to both deflect and control the direction of the drill bit. The drilling assembly is then removed from the wellbore and an underreaming drilling assembly is used to enlarge the diameter of the stub lateral 100 to about 6 inches greater than the original drilled diameter of the stub lateral 100. Then, the underreaming assembly is removed from the wellbore.

A drillable canister 122 filled with invention slurry is lowered into the drilled stub of the lateral wellbore 100 on a coiled tubing 124 which is attached to the canister 122 with a shear pin fixture or any suitable pressure release mechanism. The top of the canister 122 is configured as an entry guide or has attached thereto an entry guide 126 to accept a stinger on the bottom of a drilling assembly while the bottom of the canister 122 is centralized by the short length of standard diameter lateral stub remaining below the underreamed section. The lower end of the canister 122 is fitted with an end cap 128 having a burst diaphragm 130 in the bottom of the end cap 130. Aluminum bow-centralizer springs 132 or any other suitable means can be used to position and centralize the canister 122 within the drilled and underreamed stub of lateral wellbore 100.

After the canister 122 is lowered into the drilled stub of the lateral wellbore 100, the slurry is extruded into the underreamed portion of the lateral wellbore 100 and up into the adjacent portion of the main wellbore 110, and then the coiled tubing 124 released from the canister 122 and pulled from the wellbore. Then equipment such as a drill bit with a stinger assembly is used to drill through the centralized canister 122.

In an improvement over use of portland cement for sealing and supporting a lateral junction, the sealant forms a section of ceramic "casing" that: (a) provides an impermeable, pressure-tight seal at the lateral junction with the casing in the primary wellbore; (b) tightly adheres to and seals the surrounding formation, thereby providing a mechanical support with high compressive and shear strength for subsequent drilling operations; and (c) allows the lateral to be drilled at full diameter without the need for inserting casing in the lateral borehole until the borehole is ready for completion with a string of production tubing. In addition, after being emptied, the centralized plastic canister that contained the slurry forms an excellent drilling guide to allow the "gunbarrel" drilling out of the sealant from the stub of the lateral junction leaving an approximately uniform ceramic "casing" wall thickness.

One particularly important application for the invention sealant and method is use as a means of fluid diversion in wells where direct access to the formation is blocked by a sand control device.

Highly deviated or horizontal wells are sometimes completed using a slotted liner gravel pack, or sand screen, to stabilize the wellbore walls and to limit flow of unconsolidated, loose or friable sand from the producing formation into the wellbore while at the same time allowing the flow of gas or liquids from the producing formation into the wellbore during production of the well. These wellbore completions are referred to as sand-control completions.

Such sand-control methods complicate fluid diversion efforts by allowing fluids to flow outside the lined wellbore proper. These alternate flow paths for fluid occur between the formation and the slotted liner or sand screen, or within the gravel pack itself.

Figure 8:
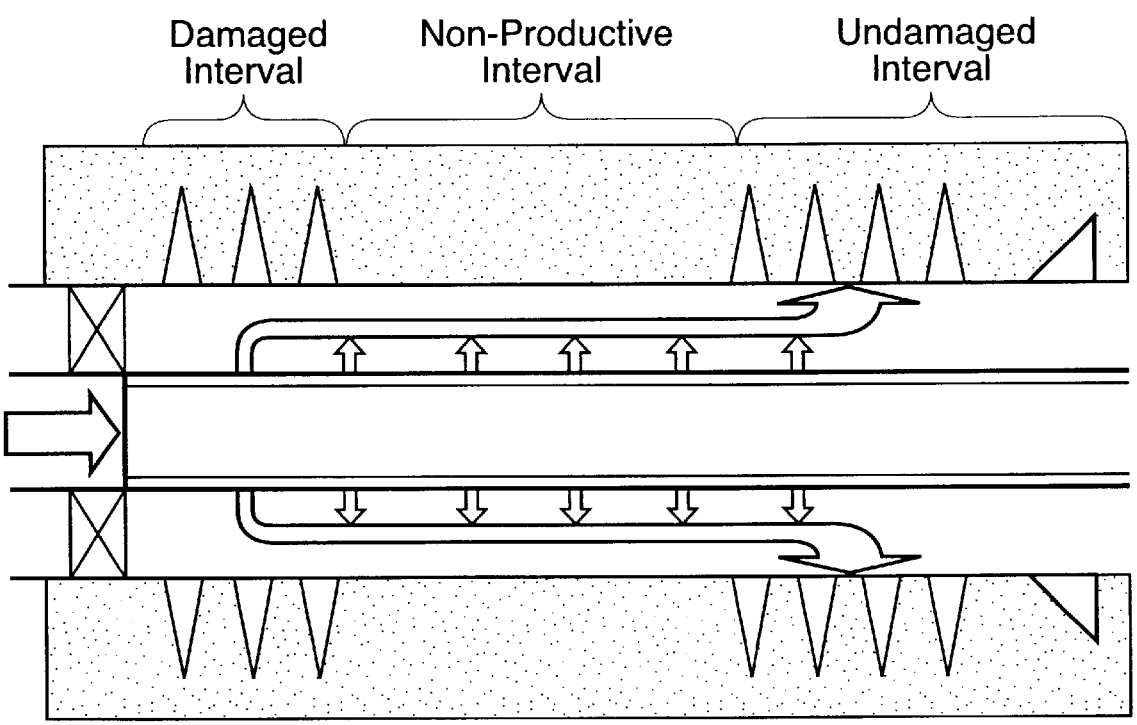
FIG. 8 is a schematic of use of the invention sealant and method in a well with a slotted liner horizontal completion.

FIG. 8 shows a schematic of damaged, non-productive and undamaged intervals in a slotted-liner horizontal completion before use of an invention sealant and method. The heavy arrow at the left of the drawing indicates direction of flow of treatment fluid or slurry during a sealing or plugging operation. The small vertical arrows along the liner and the two long essentially horizontal arrows in the annulus between the liner and the formation indicate flow of treatment fluid without diversion.

For the specific slotted-liner horizontal completion situation shown in FIG. 8, the sealant is extruded in place to provide an effective fluid diversion technique. The invention slurry can be extruded from a coiled-tubing-deployed canister made of a material (e.g., HDPE or PVC) which can easily be drilled out. The canister is positioned in a nonproductive interval between the damaged and undamaged zones of the wellbore and adjacent to a slotted section of the liner. A canister which is sealed at the bottom and fitted with an array of low-pressure burst diaphragms along its length of approximately 30 feet is generally useful. A slurry with the consistency of thin caulking compound is pressure extruded to fill both that portion of the slotted liner around the canister and to also flow through the slots and fill the annulus between the slotted liner and the formation.

When set, the sealant tightly adheres to both the formation and the steel liner, sealing both the bore of the liner and the annulus between the liner and the formation. In the specific example of the invention shown in FIG. 8, after treatment to remediate the damaged zone upstream of the sealed borehole, the only operation needed would be to drill out the bore of the slotted liner to regain access to both intervals of the wellbore since the sealant in the annulus outside the slotted liner (across the intervening nonproductive interval) does not have to be removed.

However, if there is a very limited wellbore distance between the damaged and undamaged productive intervals as shown schematically in FIG. 8, it may be necessary to actually plug off the upper portion of the undamaged production interval with extruded sealant to produce an effective diversion of the treatment fluid to the damaged production interval. Then it is subsequently necessary to remove the sealant from the liner bore by drilling and to then also remove the sealant from the slots in the liner, the annulus between the liner and the productive formation, and a shallow distance into the part of the production formation forming the borehole. This is done by dissolution of the sealant using an extruded dose of a concentrated acid, such as phosphoric acid. The acid is extruded from a coiled-tubing-deployed container fitted with burst diaphragms to accurately place the acid over the sealed interval of slotted liner, to regain access to all of the "lower" productive interval.

For a situation involving a gravel pack or sand screen, the diversion job becomes more difficult, but is still doable using a coiled-tubing-deployed canister. For these situations, the drillable canister is centralized within the screen section so that after sealing off the interval, the empty canister is used as a guide for drilling out the inside of the gravel pack or screen.

The invention compositions and methods can be very important in offshore drilling operations, particularly in deep or rough seas. Typically during the initiation of almost all deep ocean drilling operations, a string of "conductor" pipe is cemented through the very soft and friable muds, silts and sands typically occurring on the ocean floor. The bottom of the string of conductor pipe can advantageously be cemented in place and stabilized using invention compositions and methods. An invention slurry is extruded from a canister run on coiled tubing after the string of conductor pipe has been set in position. The bottom of the string of conductor pipe is fitted with a specially designed "cementing shoe" which has a lock-in device on the inside to accept a mating mandrel assembly on the bottom of the canister of invention slurry.

After the selected amount of slurry has been extruded out the bottom of the canister and up and around the lower portion of the conductor pipe as well as out into the pores of the surrounding loose and friable sediments and allowed to set up, the surrounding soft sediments are stabilized and the sealant tightly adheres to the outside of the conductor pipe, forming a mechanically supported and sealed "anchor" for the conductor pipe to the surrounding sediments.

This cementing operation could also be accomplished using drill pipe, but the use of a canister run on coiled tubing offers both a much greater degree of control and a faster overall cementing operation.

The following examples will demonstrate the operability of the invention.

EXAMPLE I

In a bench top demonstration of an invention slurry and sealant, a slurry was mixed and allowed to set up in a beaker filled with water.

An invention slurry was prepared by combining a total of 200 g of class-F fly ash, calcined magnesium oxide and monopotassium phosphate in a 60:9:31 ratio. The 200 g mixture was stirred in 20 g of water for about 20 minutes. The slurry had started reacting and had formed a thick paste. The thickened slurry was then poured into a beaker and allowed to set for about 60 minutes.

After the slurry had solidified, hot water at a temperature of 90° C. was poured onto the set slurry. The beaker was maintained at 90° C. on a hot plate for about 30 minutes. The slurry did not dissolve or react in the water.

Then 220 g of a second slurry was prepared in the same manner as the first slurry with the same ratio of components.

After about 30 minutes the second slurry had started to react and thicken. The second slurry was poured into the hot water in the beaker and was observed to be immiscible with the water. The second slurry displaced water and sank to the top of the hardened first slurry. The second slurry was allowed to cool for two hours. After two hours the water was decanted out of the beaker.

The second slurry had bonded intimately with the first slurry, forming a monolith. The monolith adhered to the glass beaker due to slight expansion that occurred during setting of the slurries.

EXAMPLE II

In another bench top demonstration of the invention, setting time as a function of temperature was measured.

A 220 g portion of slurry was prepared in the same manner as the slurries in Example I and in the same proportions of components. The beaker in which the slurry was prepared was then lowered into a water bath maintained at a temperature of 60° C. and the time of setting was measured by determining the time that the slurry took to form a hardened monolith.

The procedure was repeated at temperatures of 70° C., 80° C., and 90° C. Each time the setting time was measured.

Figure 9:
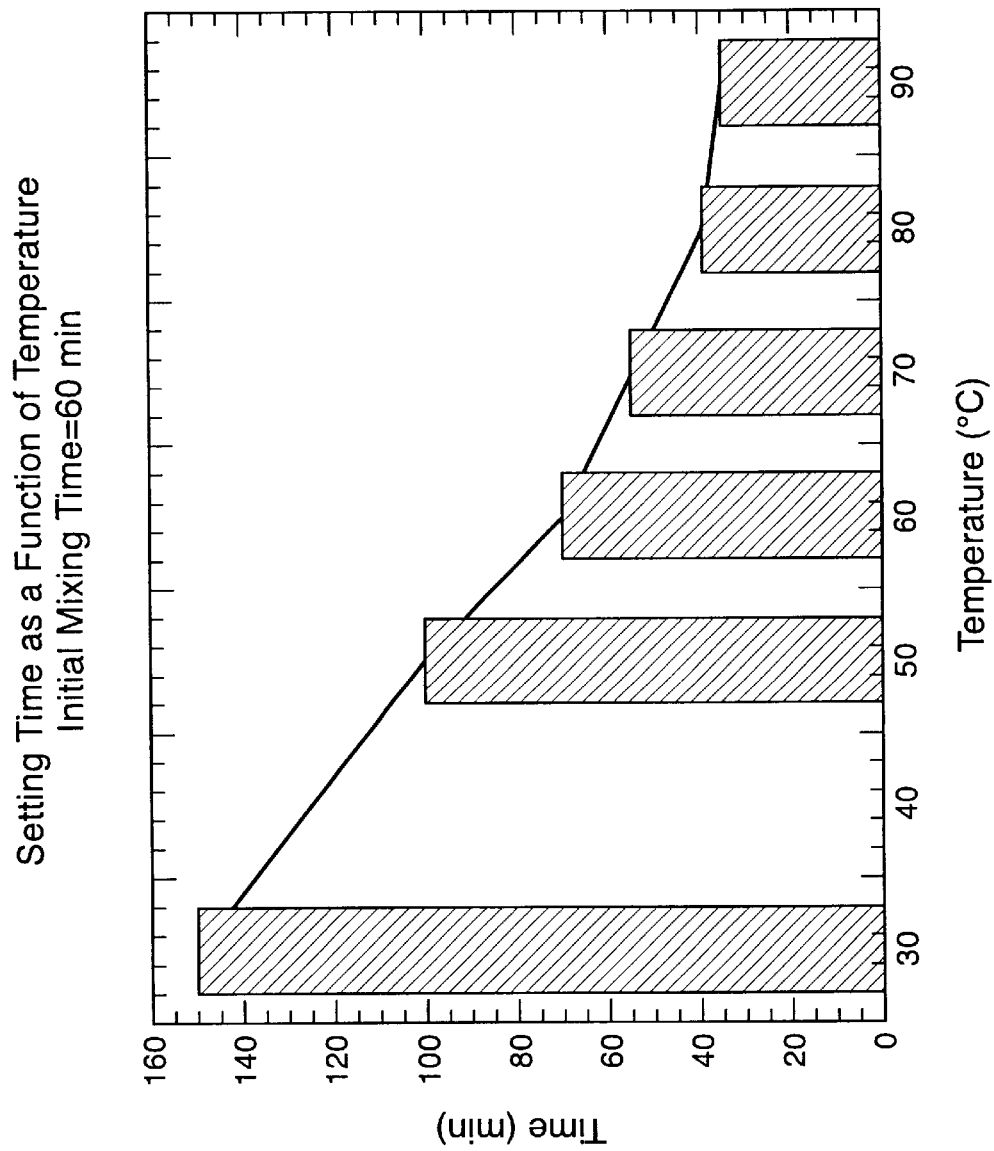
FIG. 9 is a graph of the setting time of an invention sealant as a function of temperature.

Setting times decreased as temperatures increased, ranging from a setting time of about 70 minutes at 60° C. to a setting time of about 35 minutes at 90° C. The results of this test of an invention slurry are shown in the graph of FIG. 9.

EXAMPLE III

An invention slurry prepared in the same manner as that prepared in Example I and having the same ratio of components was poured into polyethelene beakers containing sandstone, limestone and granite rocks. The rocks were several inches in size and of the sort typically found in oilfield drilling environments.

The slurry in each of the beakers was allowed to set for a day, during which time it formed into monoliths with the rocks as inclusions. The monoliths were removed from the beakers.

Figure 10:
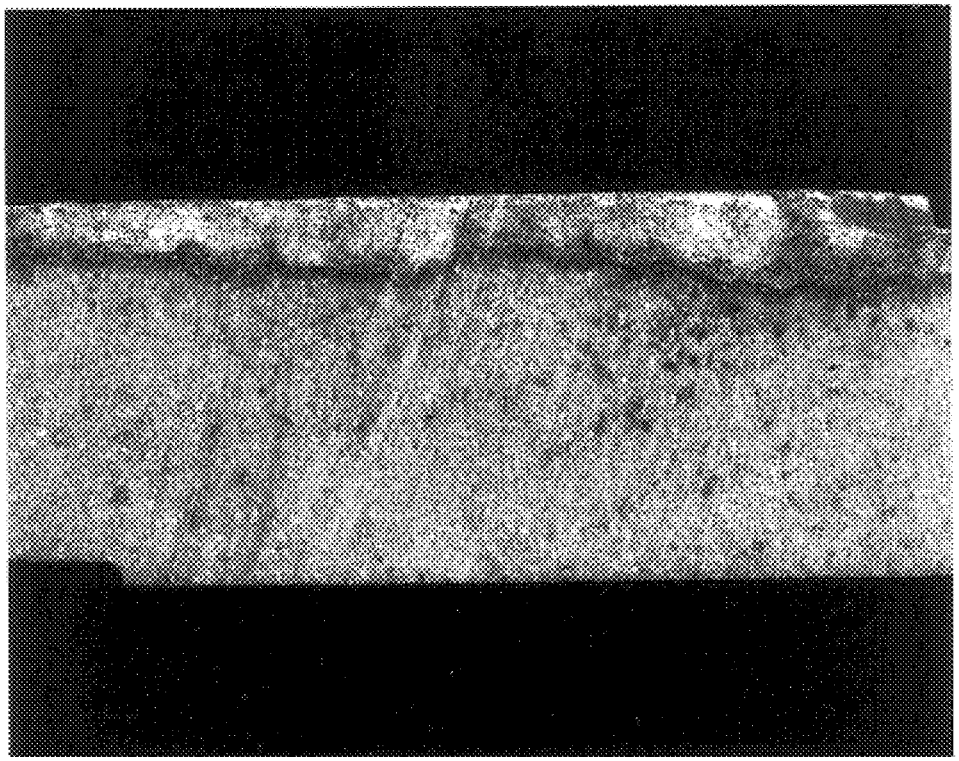
FIG. 10 is a photograph of a sandstone surface sealed with an invention sealant.

A diamond tipped saw was used to cut the monoliths into cross sections. In each case the slurry had formed into a sealant which encapsulated the rocks with no gaps at the interface between the rock surfaces and the slurry. In fact, the slurry had penetrated into the pores in the surfaces of the rocks forming a tight bond and excellent seal with the rocks. A cross section of this is shown in the photograph of FIG. 10.

While the methods and compositions of this invention have been described in detail for the purpose of illustration, the inventive methods and compositions are not to be construed as limited thereby. This patent is intended to cover all changes and modifications within the spirit and scope thereof.

Industrial Applicability

The slurries, sealants and methods of this invention can be used for treating or repairing boreholes at specific depths; sealing zones of inflow from formations or outflow of drilling fluids; diversion of fluids for treatment of oil, gas, geothermal and water wells; and temporarily or permanently plugging wellbores at specific depths.

What is claimed is:

1. A canister for placing a slurry in a borehole comprising:
   (a) a container having a first end, a second end, and an inner container wall;
   (b) a pump attached to said first end of said container;
   (c) a slurry that forms a sealant for sealing the borehole after exiting said container;
   (d) at least one slurry exit at said second end of said container;
   (e) a movable piston sealingly engaged to said inner container wall and located between said pump and said at least one slurry exit, said piston and said inner container wall and said slurry exit defining a volume for receiving said slurry; and
   (f) an inflatable packer on the outer circumference of said container.

2. The canister as recited in claim 1 wherein said at least one slurry exit is at least one valve.

3. The canister as recited in claim 1 wherein said at least one slurry exit is a plurality of valves.

4. The canister as recited in claim 3 wherein said plurality of valves are located circumferentially about the second end of said container.

5. The canister as recited in claim 1 wherein said at least one slurry exit is at least one burst diaphragm.

6. The canister as recited in claim 3 wherein said at least one burst diaphragm is at said second end of said container.

7. The canister as recited in claim 1 wherein said container is a joint of a drill pipe.

8. The canister as recited in claim 1 made of a drillable material.

9. The canister as recited in claim 1 wherein said container is made of a material selected from the group consisting of PVC and HCPE.

10. The canister as recited in claim 1 wherein said first end of said container is shaped to serve as a conical guide for a drill bit.

11. The canister as recited in claim 1 wherein said pump is releasably attached to said container thereby permitting said pump to be withdrawn from said borehole leaving said canister in said borehole.

12. The canister as recited in claim 1 wherein said pump is attached to an electric wire line.

13. The canister as recited in claim 1 wherein said pump is attached to coiled tubing.

14. The canister as recited in claim 1 wherein said container has a stop mechanism in said second end of said container to prevent said piston from exiting said container.

* * * * *